(12) United States Patent
Chen et al.

(10) Patent No.: US 12,225,629 B2
(45) Date of Patent: Feb. 11, 2025

(54) RAPID PROVISIONING OF WIRELESS LOCAL AREA NETWORK DEVICES

(71) Applicant: RAB Lighting Inc., Northvale, NJ (US)

(72) Inventors: Benjamin Chen, Carlsbad, CA (US); Yun Fei Xu, Shanghai (CN); Xian Long Ding, Shanghai (CN)

(73) Assignee: RAB Lighting Inc., New York, NY (US)

( * ) Notice: Subject to any disclaimer, the term of this patent is extended or adjusted under 35 U.S.C. 154(b) by 294 days.

(21) Appl. No.: 17/690,668

(22) Filed: Mar. 9, 2022

(65) Prior Publication Data

US 2023/0292105 A1 Sep. 14, 2023

(51) Int. Cl.
*H04W 8/22* (2009.01)
*H04W 4/06* (2009.01)
(Continued)

(52) U.S. Cl.
CPC ............ *H04W 8/22* (2013.01); *H04W 4/06* (2013.01); *H04W 8/005* (2013.01); *H04W 12/04* (2013.01); *H05B 47/115* (2020.01); *H05B 47/19* (2020.01); *H04W 84/12* (2013.01); *H05B 45/10* (2020.01); *H05B 45/20* (2020.01)

(58) Field of Classification Search
CPC ......... H04W 8/22; H04W 4/06; H04W 8/005; H04W 12/04; H04W 84/12; H04W 4/50; H04W 12/35; H04W 84/18; H05B 47/115; H05B 47/19; H05B 45/10; H05B 45/20;
(Continued)

(56) References Cited

U.S. PATENT DOCUMENTS 7,987,228 B2 * 7/2011 McKeown .......... H04L 41/0631
709/224
2006/0209773 A1 * 9/2006 Hundal ................... H04L 63/06
370/338

(Continued)

OTHER PUBLICATIONS

Bluetooth Tutorial retrieved from <https://github.com/espressif/esp-idf/blob/master/examples/bluetooth/esp_ble_mesh/ble_mesh_fast_provision/fast_prov_client/tutorial/BLE_Mesh_Fast_Prov_Client_Example_Walkthrough.md> on Aug. 25, 2021.

(Continued)

*Primary Examiner* — Thai Nguyen
(74) *Attorney, Agent, or Firm* — Innovation Law Office; Dennis S. Schell

(57) ABSTRACT

A wireless device system can include lighting devices, sensing devices, and other wireless devices in a wireless mesh local area network. The devices are configured for rapid provisioning with provisioned site network data by using a process in which each device stores data for a default provisioning network, and a provisioning device, for example a smart phone or other mobile device, is used to wirelessly connect with at least one of the devices in the default provisioning network, enabling distant wireless devices to be reached by relay of messages in the default provisioning network. Devices can be individually provided a new network address, for example, from the provisioned site network data, and all devices are provided remaining data from the provisioned site network data using the mesh network broadcast feature, thus provisioning and switching devices near simultaneously from the default provisioning network to the provisioned site network.

17 Claims, 4 Drawing Sheets

(51) Int. Cl.
　　*H04W 8/00*　　　(2009.01)
　　*H04W 12/04*　　(2021.01)
　　*H05B 47/115*　　(2020.01)
　　*H05B 47/19*　　(2020.01)
　　*H04W 84/12*　　(2009.01)
　　*H05B 45/10*　　(2020.01)
　　*H05B 45/20*　　(2020.01)

(58) Field of Classification Search
　　CPC ............ H04L 61/5014; H04L 12/2801; H04N 21/6402
　　See application file for complete search history.

(56) References Cited

U.S. PATENT DOCUMENTS

2015/0372875 A1　12/2015　Turon et al.
2017/0026234 A1*　1/2017　Dhulipala ........... H04L 41/0806
2020/0275272 A1*　8/2020　Montemurro ....... H04L 63/0876
2021/0058784 A1*　2/2021　Kedalagudde ........ H04W 48/18

OTHER PUBLICATIONS

Bluetooth Tutorial retrieved from <https://github.com/espressif/esp-idf/blob/master/examples/bluetooth/esp_ble_mesh/ble_mesh_fast_provision/fast_prov_server/tutorial/BLE_Mesh_Fast_Prov_Server_Example_Walkthrough.md> on Aug. 25, 2021.

Mass Provisioning of Nordic BLE Mesh Nodes article retrieved from <https://devzone.nordicsemi.com/guides/short-range-guides/b/mesh-networks/posts/mass-provisioning-of-nordic-ble-mesh-nodes> on Aug. 25, 2021.

Bluetooth Tutorial retrieved from <https://github.com/espressif/esp-idf/blob/master/examples/bluetooth/esp_ble_mesh/ble_mesh_fast_provision/fast_prov_server/tutorial/EspBleMesh.md> on Aug. 25, 2021.

* cited by examiner

RAPID PROVISIONING OF WIRELESS LOCAL AREA NETWORK DEVICES

TECHNICAL FIELD

Embodiments of this disclosure relate generally to wireless local area network devices, and more particularly to provisioning of devices in a wireless local area network.

BACKGROUND

The growth of internet of things (IoT) products has led to time intensive tasks in setting up large scale networks. Provisioning wireless devices for a wireless network system, for example, a local area network (LAN), can take many hours. To provision wireless device in such a network, a user generally must use a device that is within wireless reception range with each device, for example, less than or equal to 100 meters, and often closer for low-energy wireless devices, even if mesh network technology is used. Additionally, the devices must be provisioned one at a time. In some cases, once installed and wired for power, individual wireless devices may be difficult to access physically, making it particularly difficult if a switch associated with the wireless device must be manually actuated for the device to be provisioned.

For example, one standard mesh network provisioning process provisions one device for the network at a time, and requires the provisioning device be in direct wireless contact with each device as it is provisioned. Typical steps that must be completed individually for each device for it to be provisioned include: initiate device beaconing, respond with an invitation to join, exchange of public keys, authentication of the devices, and distribute of confidential provisioning data to the wireless device for the new LAN. This process can take more than 10 seconds for each device, making provisioning a wireless device system involving a couple of hundred devices, for example, wireless lighting installations, take hours.

It was appreciated by the inventors of the present disclosure that advantages can be realized by overcoming these time consuming and physical proximity obstacles. The present disclosure is responsive to at least such an endeavor and at least some embodiments are directed to one or more of the problems or issues set forth above, and may be directed to others problems as well.

SUMMARY

Embodiments of the present disclosure provide lighting devices, sensing devices, and other wireless devices used in a wireless mesh local area network that are configured for rapid provisioning with provisioned site network data by using a process in which each device stores data for a default provisioning network, and a provisioning device, for example a smart phone or other mobile device, is used to wirelessly connect with at least one of the devices in the default provisioning network, enabling distant wireless devices to be reached by relay of messages in the default provisioning network. Devices can be individually provided a new network address, for example, from the provisioned site network data, and all devices are provided remaining data from the provisioned site network data using the mesh network broadcast feature, thus provisioning and switching devices near simultaneously from the default provisioning network to the provisioned site network.

A wireless device for wireless local area networks provisioned by a provisioning device can comprise: a processor; a memory coupled to the processor and storing default provisioning network data, including a provisional device address; a wireless transceiver coupled to the processor; at least one of a sensing device and an output device; the processor configured to use the wireless transceiver and memory to: join a default provisioning network; receive from the provisioning device a broadcast message request for the device address; transmit to the provisioning device the provisional device address; receive from the provisioning device a unicast message including a new device address for the wireless device in a provisioned site network; store the new device address in the memory; receive from the provisioning device a broadcast message including provisioned site network data; store the provisioned site network data in the memory; and switch from the default provisioning network to the provisioned site network; and wherein at least one of the provisioning device and a remote control device is capable of operability with the at least one of a sensing device an output device.

The wireless device wherein the output device includes a light source for illumination and the at least one of the provisioning device and the remote control device is capable of controlling the light source. The wireless device wherein the light source includes an LED. The wireless device wherein the sensing device includes at least one of an occupancy and vacancy sensor and the provisioning device is configured to enable user configuration of control of the output device based at least in part on occupancy and vacancy data. The wireless device wherein at least one of the default provisioning network and the provisioned site network is a mesh network and the unicast message and broadcast message are received from the provisioning device via at least one intermediate mesh network node formed by another wireless device. The wireless device wherein the default provisioning network data includes a provisioning device security key and a default provisioning network security key. The wireless device wherein the provisioned site network data includes a provisioning device security key, provisioned site network security key, and a device security key.

A wireless device system can comprise: a provisioning device including a user interface, processor, a memory, and a wireless transceiver; a plurality of wireless devices each including: a processor; a memory coupled to the processor and storing default provisioning network data, including a provisional device address; a wireless transceiver coupled to the processor; at least one of a sensing device and an output device; the provisioning device and the plurality of wireless devices configured to: use the default provisioning network data to form a provisioning network; send a broadcast message from the provisioning device to request a device address from each of the plurality of wireless devices; transmit from each of the plurality of wireless devices to the provisioning device the provisional device address; send a unicast message from the provisioning device to each of the plurality of wireless devices, each of the unicast messages including a new device address for the wireless device in a provisioned site network; store the new device address in the memory of each of the plurality of wireless devices; send a broadcast message from the provisioning device, the broadcast message including provisioned site network data; store the provisioned site network data in the memory of each of the plurality of wireless devices; and switch the plurality of wireless devices and the provisioning device from the default provisioning network to the provisioned site network.

The system wherein the provisioning device is operable with the at least one of a sensing device and an output device. The system wherein one of the plurality of wireless devices is a remote control device, and the sensing device of the remote control device includes a switch operable by a user to control at least a subset of the plurality of wireless devices. The system wherein the output device of at least one of the plurality of wireless devices includes a light source for illumination and the provisioning device is capable of controlling the light source. The system of claim 11, wherein the light source includes an LED. The system wherein the sensing device of at least one of the plurality of wireless devices includes at least one of an occupancy and vacancy sensor and the provisioning device is capable of configuring control of at least a subset of the plurality of wireless devices based at least in part on occupancy and vacancy data from the sensor. The system wherein at least one of the default provisioning network and the provisioned site network is a mesh network and the unicast messages and the broadcast messages are received and retransmitted by at least one intermediate mesh network node formed by at least one of the plurality of wireless devices. The system wherein the default provisioning network data includes a provisioning device security key and a default provisioning network security key. The system wherein the provisioned site network data includes a provisioning device security key, provisioned site network security key, and a device security key. The system wherein: the provisioning device is configured to enable a user to divide the plurality of wireless devices into a plurality of subsets; and the plurality of wireless devices of each of the plurality of subsets are controlled together.

A process of provisioning a wireless device system, can comprise: forming a provisioning network using provisioning network data stored in a provisioning device and in a plurality of wireless devices; send a broadcast message from the provisioning device to request a device address from each of the plurality of wireless devices; transmit from each of the plurality of wireless devices to the provisioning device the provisional device address; send a unicast message from the provisioning device to each of the plurality of wireless devices, each of the unicast messages including a new device address for the wireless device in a provisioned site network; set the new device address for each of the plurality of wireless devices; send a broadcast message from the provisioning device, the broadcast message including provisioned site network data; set the provisioned site network data for each of the plurality of wireless devices; and switch the plurality of wireless devices and the provisioning device from the default provisioning network to the provisioned site network.

The process further comprising a user setting another wireless device to broadcast a join message; and the provisioning device configuring the another wireless device to join the provisioned site network. The process wherein the another wireless device is a remote control device; and the remote control device is configured to control at least one of the plurality of the wireless devices. The process further comprising a user operating the provisioning device to select a subset of the plurality of wireless devices; and operably controlling the subset of the plurality of wireless devices together.

This summary is provided to introduce a selection of concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim. Each embodiment described herein does not necessarily address every object described herein, and each embodiment does not necessarily include each feature described. Other forms, embodiments, objects, advantages, benefits, features, and aspects of the present disclosure will become apparent to one of skill in the art from the detailed description and drawings contained herein. Moreover, the various apparatuses and methods described in this summary section, as well as elsewhere in this application, can be expressed as a large number of different combinations and sub-combinations. All such useful, novel, and inventive combinations and sub-combinations are contemplated herein, it being recognized that the explicit expression of each of these combinations is unnecessary.

DETAILED DESCRIPTION OF THE ILLUSTRATED EMBODIMENTS

Figure 1:
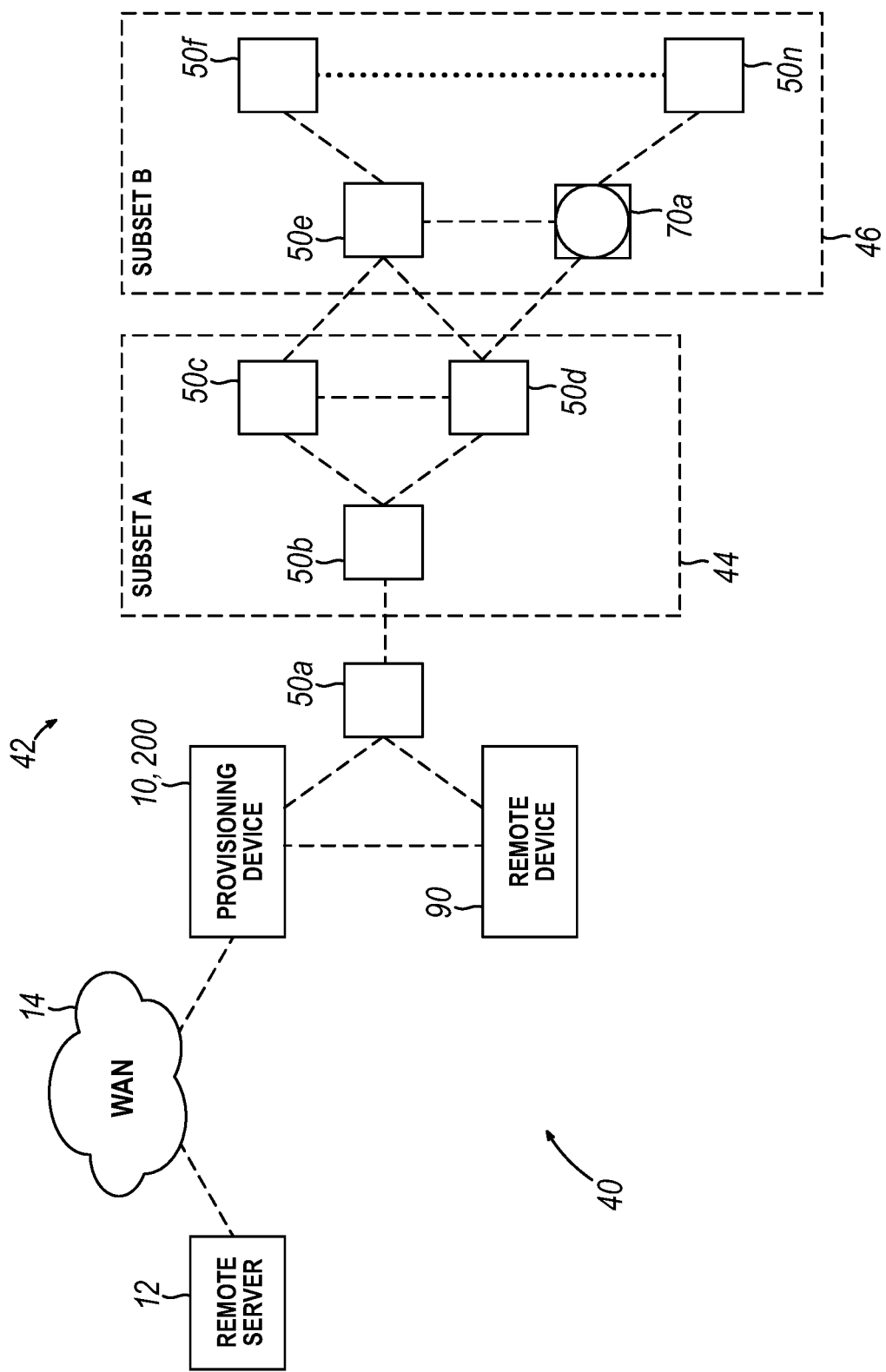
FIG. 1 is an illustrative schematic block diagram of a wireless device system according to the present disclosure.

For the purposes of promoting an understanding of the principles of the disclosure, reference will now be made to one or more embodiments, which may or may not be illustrated in the drawings, and specific language will be used to describe the same. It will nevertheless be understood that no limitation of the scope of the disclosure is thereby intended; any alterations and further modifications of the described or illustrated embodiments, and any further applications of the principles of the disclosure as illustrated herein are contemplated as would normally occur to one skilled in the art to which the disclosure relates. At least one embodiment of the disclosure is shown in great detail, although it will be apparent to those skilled in the relevant art that some features or some combinations of features may not be shown for the sake of clarity.

Any reference to "invention" within this document is a reference to an embodiment of a family of inventions, with no single embodiment including features that are necessarily included in all embodiments, unless otherwise stated. Furthermore, although there may be references to benefits or advantages provided by some embodiments, other embodiments may not include those same benefits or advantages, or may include different benefits or advantages. Any benefits or advantages described herein are not to be construed as limiting to any of the claims.

Likewise, there may be discussion with regards to "objects" associated with some embodiments of the present invention, it is understood that yet other embodiments may not be associated with those same objects, or may include yet different objects. Any advantages, objects, or similar words used herein are not to be construed as limiting to any of the claims. The usage of words indicating preference, such as "preferably," refers to features and aspects that are present in at least one embodiment, but which are optional for some embodiments.

Specific quantities (spatial dimensions, temperatures, pressures, times, force, resistance, current, voltage, concentrations, wavelengths, frequencies, heat transfer coefficients, dimensionless parameters, etc.) may be used explicitly or implicitly herein, such specific quantities are presented as examples only and are approximate values unless otherwise indicated. Discussions pertaining to specific compositions of matter, if present, are presented as examples only and do not limit the applicability of other compositions of matter, especially other compositions of matter with similar properties, unless otherwise indicated.

Referring to FIG. 1, an illustrative embodiments of a wireless device system 40 according to the present disclosure includes wireless lighting devices 50a-n, a sensing device 70a, and a remote control device 90, used in a wireless mesh local area network 42. The wireless devices 50, 70, and 90 are configured for rapid provisioning with provisioned site network data by using an illustrative process 100, depicted in FIGS. 2 and 3. Provisioned site network data is confidential network configuration data unique to the site installation for network 42, and thus provides a level of security. Rapid provisioning is particularly advantageous in embodiments of system 40 such as a large scale replacement of existing lamp bulbs with lighting devices 50a-n comprising LED smart lamps, for example, to be installed in existing light fixtures in a large facility or outdoor area. Although the wireless devices 50a-n will be discussed in the context of lighting devices used with an illustrative wireless device system 40 for lighting, the wireless systems and wireless devices may comprise other types of wireless network systems and wireless devices, and for example, including the other examples given herein.

A provisioning device 10, for example a smart phone or other mobile device, can be used to wirelessly connect with at least one of the devices, for example wireless lighting device 50a, using a default provisioning network that enables more distant wireless devices 50b-n and 70a to be reached by relay of messages in the default provisioning network. As will be discussed in more detail below, after the wireless devices 50a-n and 70a are individually provided a new network address from a set of provisioned site network data, advantageously, all of the wireless devices are provided remaining data from the provisioned site network data using the mesh network broadcast feature, thus provisioning and switching all devices near simultaneously from the default provisioning network to a provisioned site network.

Figure 4:
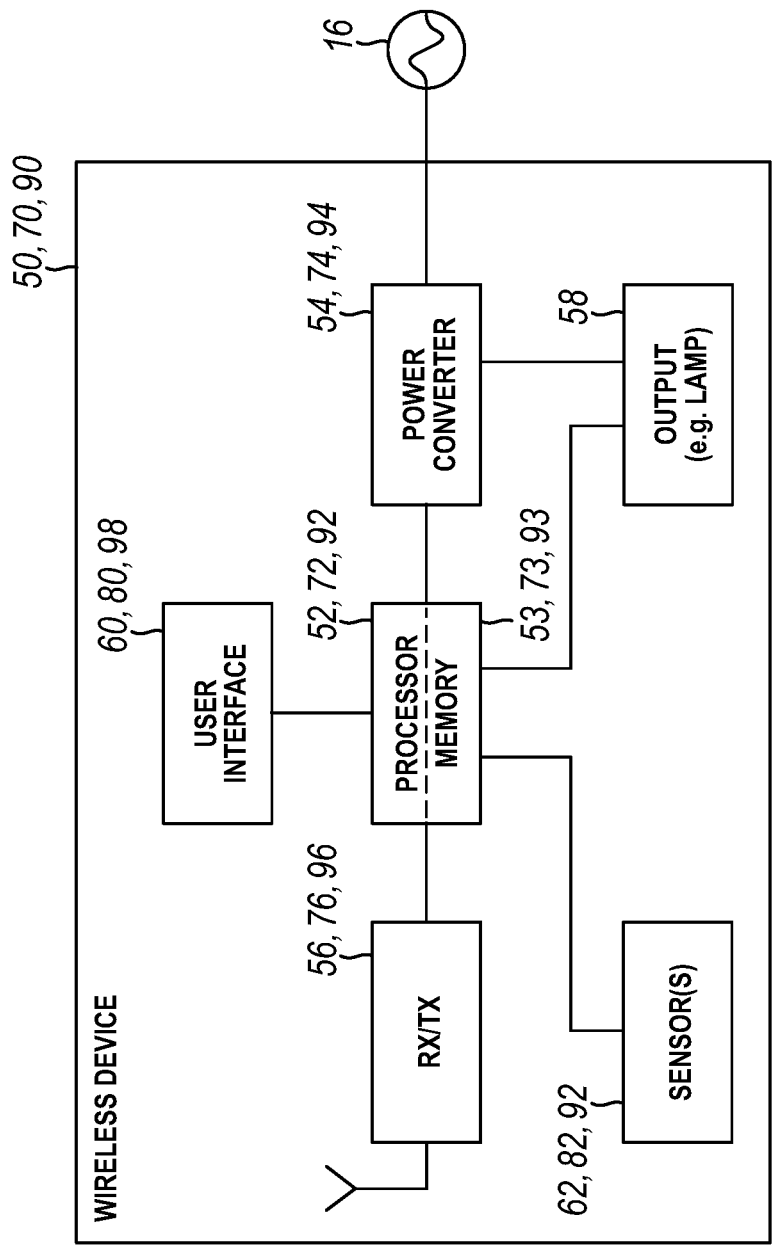
FIG. 4 is an illustrative schematic block diagram of a wireless device of the system of FIG. 1.

Referring now to FIG. 4, illustrative wireless devices including a lighting device 50, sensing device 70, and remote control device 90 are illustrated. Each of the wireless devices 50, 70, and 90 include a processor 52, 72, 94, a memory 53, 73, 94, a power converter 54, 74, 94, and a transceiver 56, 76, 96. Note that the schematic block diagram of FIG. 4 is depicted functionally, and as such, the actual hardware configuration of wireless devices 50, 70, and 90 may be divided or integrated differently, including the use of known single-chip solutions incorporating many or all of the features depicted in FIG. 4.

The power converter 54, 74, 94 may optionally receive external power, for example from an AC power source 16, converted to a DC voltage(s) required for the various components, or may optionally or additionally include battery power and a power monitor and/or regulator. The transceiver 56, 76, 96 may include one or more standard hardware and network protocols used in wireless local area networks (LANs), including wireless mesh networks, including wireless personal area networks, for example, including BLUETOOTH® (registered trademark of Bluetooth SIG, Inc., Kirkland, WA), BLE® (registered trademark of Bluetooth SIG, Inc., Kirkland, WA), ZIGBEE® (registered trademark of Connectivity Standards Alliance, Davis, CA), and other proprietary or nonproprietary transceiver and network protocols. Provisioning device 10 and remote control device 90 advantageous use the same network protocol, for example, in the illustrative embodiment BLE® mesh networking.

The devices 50, 70, and 90 may optionally include a user interface 60, 80, 98. For example, lighting device 50 and sensing device 70 may include in user interfaces 60 and 80, respectively, LED indicators to indicate status of the device, such as provisioned, unprovisioned, and the like. Additionally, user interfaces 60 and 80 may include a manual or other form of input switch to select a mode, including to start the provisioning process for the wireless device. Remote control device 90, which is provided to monitor and/or control wireless devices 50 and 70, may also include a user interface 98, including one or more forms of control input devices, for example, electro-mechanical switches, proximity or touch sensitive soft switches, and optional indicating devices, including indicator lights and a display screen.

The sensing device 70 includes one or more sensors 82. For example, sensors may include one or more of, but not limited to, occupancy/vacancy sensors such as passive infrared (PIR), temperature, humidity, audio, and imaging devices such as a digital camera. Wireless lighting device 50 and remote control device 90 may also optionally include one or more of these or other sensors 62 and 92.

Wireless device 50, a wireless lighting device in the illustrative embodiment, may also include an output device 58. For example, in the illustrative embodiment the output device 58 includes a light source, for example an LED or other light emitter. Advantageously, the output device 58 may include control circuits, for example, to adjust lumen output (e.g. dimming, on/off), color temperature, color rendering, and the like.

Other wireless devices are also within the scope of this disclosure for the wireless devices 50 and 70, with the output device 58 and or sensor(s) 62 and 82 comprising other features known in the art. For example, output device 58 could be an audio speaker, actuator, indicator light, or other device capable of providing a controlled output of energy. Input sensor(s) 62, 82 and 92 may include sensors for other detectable characteristics or activity, including but not limited to vibration, proximity, motion, location, weight, light level, and chemical/biological detectors.

Figure 2:
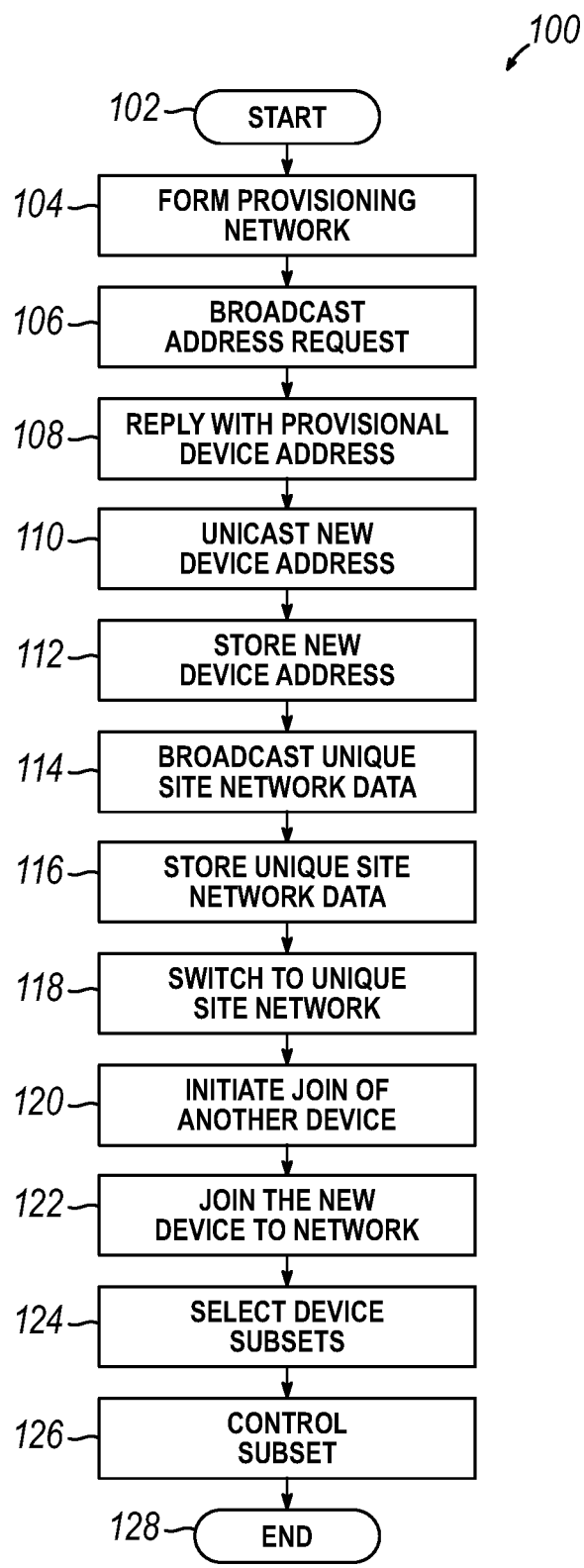
FIG. 2 is an illustrative process for rapid provisioning of the system of FIG. 1 according to the present disclosure.
Figure 3:
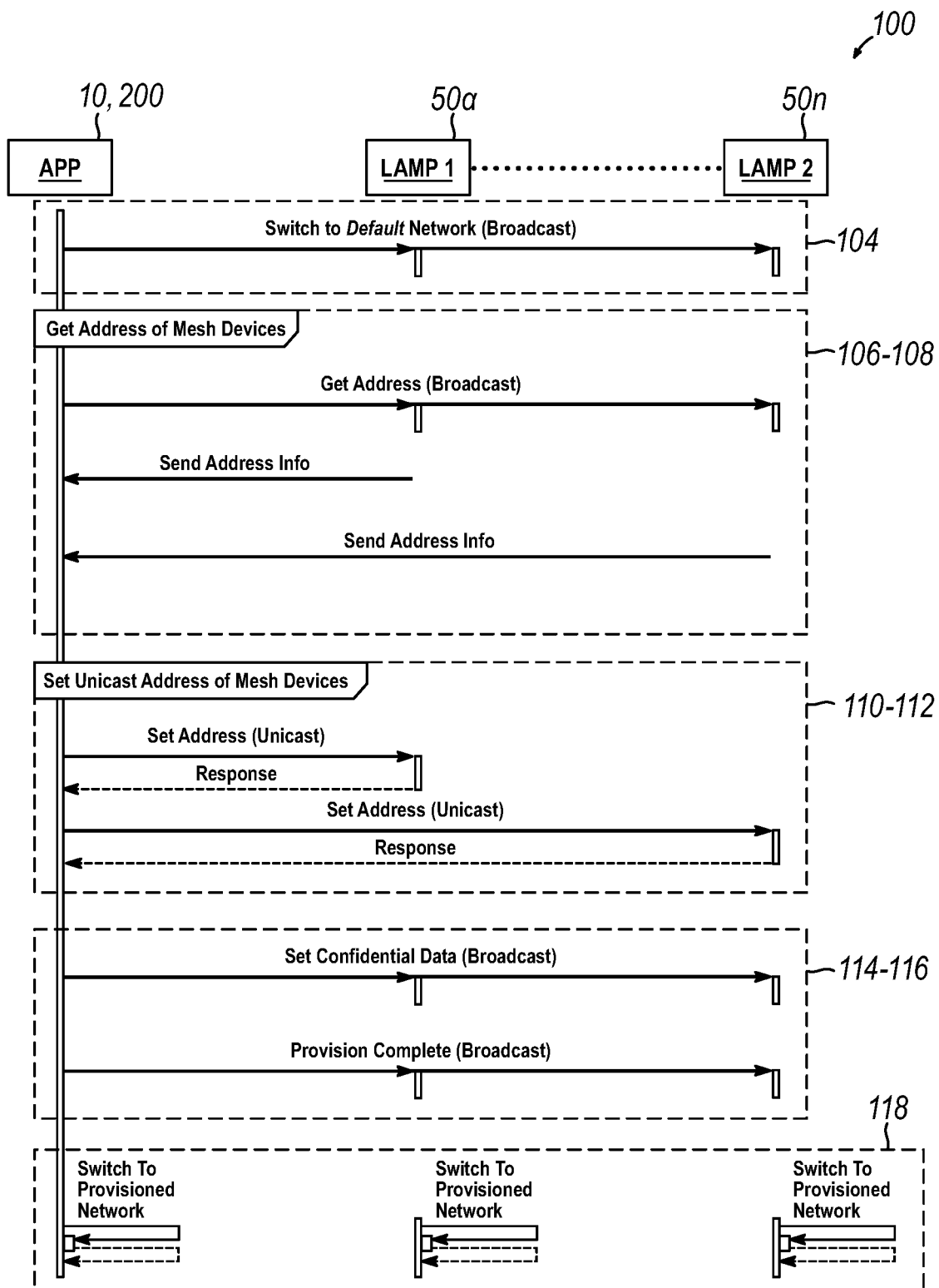
FIG. 3 is an illustrative network data signals sequence diagram for a portion of the process of FIG. 2.

Referring now to FIGS. 2 and 3, an illustrative process 100 of provisioning the wireless devices 50a-n, 70a, and 90 of the wireless device system 40 of FIG. 1 is depicted. At step 102 the process 100 begins. Provisioning device 10 includes software, for example, a provisioning application (app) 200 downloaded from a remote (e.g. physical or virtual) server 12 via a wide area network (WAN), for example, via a Wi-Fi® (registered trademark of the Wi-Fi Alliance, Austin, TX) or a cellular network accessing the Internet. The provisioning app 200 optionally may also be used to control and monitor the system 40 after provisioning of the devices 50a-n, 70a, and 90.

The wireless devices 50a-n, 70, and 90 each are provided, for example as part of the manufacturing or distribution process before delivery to a user, with default provisioning network data stored in their respective memory 53, 73, 93. The provisioning app 200 can also store the default provisioning network data or access it via WAN 14 and remote server 12. The default provisioning network data can include, for example, a provisioning device security key and a default provisioning network key used in step 104 for forming and/or switching to a default provisioning network.

The devices 50a-n, 70, and 90 may be pre-configured to automatically switch to the default provisioning network upon initial application of power source 16 or other application of power, for example after installation, and/or upon initiation of a preselected input via the user interface 60, 80, 98. For example, in typical protocols the wireless devices provide an advertising message or other beacon data message that allows discovery of the devices by the provisioning device 10 and app 200 alone or in coordination with other wireless devices. This step and the provisioning network data, including security keys, enable the wireless devices 50a-n, 70, and 90 to quickly join and form a default provisioning network, such as a LAN, for example a mesh network, and to each communicate with the provisioning device 10 and application 200, including indirectly by relay through intermediate nodes formed by various wireless devices 50a-n, 70, and 90. In this way, the provisioning can occur after the wireless devices have been installed in their intended location for use, regardless of proximity to the provisioning device 10 as long as other wireless devices in network 42 form a continuous chain of mesh network nodes, each within wireless range of at least one other wireless device, the chain of nodes providing relay of messages between any one device 50a-n, 70, and 90 and the provisioning device 10.

At step 106, the provisioning device 10 and app 200 discovery of all the wireless devices 50a-n, 70, and 90 available to be provisioned proceeds with the provisioning device and app sending a broadcast message request for address discovery. This may include, for example, a request that each wireless device respond with its universal unique identifier (UUID), media access control (MAC) address, and/or default provisional network address (referred to herein individually or collectively as the "provisional device address"). The wireless devices 50a-n, 70, and 90 each respond accordingly with a unicast message containing the provisional device address to the provisioning device 10 and app 200 in step 108.

A unicast message as used herein means a message sent by a single sending node to be delivered to another single receiving node in the network 42. In system 40 and network 42, the sending or receiving is the provisioning device 10 and the other of the sending and receiving is a single wireless device 50a-n, 70, and 90. This is in contrast to a broadcast message sent by the provisioning device 10 and app 200 to be received by all wireless devices 50a-n, 70, and 90. Unicast messages are generally more time consuming if required for all devices in a network as the message for each device must be sent separately and sequentially, while broadcast messages are very time efficient when intended for all devices in a network, as the message is sent once by the provisioning device 10 rather than repeatedly sent one at a time to each of the devices in the network.

In step 110 the app 200 assigns a new device address for the provisioned site network being provisioned for each of the wireless devices 50a-n, 70, and 90 and sends the new device addresses via a unicast message to each device. In step 112, each wireless device 50a-n, 70, and 90 receives the unicast message addressed to it and stores this information in its memory 53, 73, 93.

Advantageously, the remaining provisioning steps may be completed nearly simultaneously across all wireless devices 50a-n, 70, and 90, greatly reducing the time required to provision the system 40. At step 114 the provisioning device 10 and app 200 broadcasts the remaining data for the provisioned site network, including, for example, a provisioning device security key, provisioned site network security key, and a wireless device key. At step 116, the wireless devices 50a-n, 70, and 90 receive the broadcast message and store the data in their respective memory 53, 73, and 93.

In step 118, the provisioning device 10 and app 200 and the wireless devices 50a-n, 70, and 90 switch to the provisioned site network 42 and the provisioning of wireless device system 40 is completed.

Optionally, at step 120 a user can initiate the joining of other wireless devices 50a-n, 70, and 90. For example, a remote control device 90 may be added to the wireless device system 40, or one or more other devices added. The user can initiate joining of the new wireless device(s) by application of power and/or upon initiation of a preselected input via the user interface 60, 80, 98, and selecting to join the wireless device(s) to provisioned site network 42 using app 200 of provisioning device 10. For example, the at step 120, the new device to be joined to the provisioned site network 42 by completing steps 104-118 described above, but directed just to that individual device, or may switch all devices in system 40 to the default provisioning network at step 104 in order to add new wireless devices not within wireless range of provisioning device 10.

Optionally, in step 124 the provisioning device 10 and app 200 can be used to provide a list of all devices of the provisioned site network 42 and organize the devices. For example, to select a subset of those devices to be operatively related. For example, as shown in FIG. 1, subset A 44 and subset B 46 have each been grouped together. An example of such an advantage is that at step 126 each subset can be controlled together as a group. For example, subset A 44 may be the lighting devices for a room which are preferred to be illuminated the same. Similarly, subset B 46 may be the lighting devices for another area, and may be activate at least in part by the sensing device 70a co-located in that area, for example, for occupancy and/or vacancy operation.

By taking advantage of broadcast messages and the default provisioning network, the rapid provisioning process 100 substantially reduces the amount of network messages and associated communication time needed for provisioning. The process 100 also eliminates the need to be physically proximate to all wireless devices in order to establish direct wireless communication with every device of wireless device system 40. The process 100 thus provides a significant savings in time, convenience, and, in some cases, safety by foregoing having to locate the provisioning device 10 close enough to each wireless device 50a-n, 70, and 90 to be joined to the network 42.

The wireless device system 40 and process 100 may also incorporate features used in known wireless lighting systems and their related configuration, scheduling, automation, and circadian stimulus illumination features and the like as are disclosed in U.S. Pat. No. 10,085,328, titled Wireless Lighting Control Systems and Methods, issued Sep. 25, 2018, U.S. Pat. No. 10,531,545, titled Commissioning a Configurable User Control Device for a Lighting Control System, issued Jan. 7, 2020, and US Patent Application Publication No. 20210045220, titled Circadian Stimulus Illumination Control Systems and Methods, published Feb. 11, 2021, each of which are incorporated herein by reference. For example, the provisioning device 10 and app 200 may incorporate such configuration, control, and monitoring features, alone or in combination with the remote service 12, WAN 14, and devices 50*a-n*, 70*a*, and 90.

Reference systems that may be used herein can refer generally to various directions (e.g., upper, lower, forward and rearward), which are merely offered to assist the reader in understanding the various embodiments of the disclosure and are not to be interpreted as limiting. Other reference systems may be used to describe various embodiments, such as referring to the direction of projectile movement as it exits the firearm as being up, down, rearward or any other direction.

While examples, one or more representative embodiments and specific forms of the disclosure have been illustrated and described in detail in the drawings and foregoing description, the same is to be considered as illustrative and not restrictive or limiting. The description of particular features in one embodiment does not imply that those particular features are necessarily limited to that one embodiment. Some or all of the features of one embodiment can be used in combination with some or all of the features of other embodiments as would be understood by one of ordinary skill in the art, whether or not explicitly described as such. One or more exemplary embodiments have been shown and described, and all changes and modifications that come within the spirit of the disclosure are desired to be protected.

What is claimed is:

1. A wireless device for wireless local area networks provisioned by a provisioning device, comprising:
    a processor;
    a memory coupled to the processor and storing default provisioning network data, including a provisional device address;
    a wireless transceiver coupled to the processor;
    at least one of a sensing device and an output device;
    the processor configured to use the wireless transceiver and memory to:
      join a default provisioning network;
      receive from the provisioning device a broadcast message request for the provisional device address;
      transmit to the provisioning device the provisional device address;
      receive from the provisioning device a unicast message including a new device address for the wireless device in a provisioned site network;
      store the new device address in the memory;
      receive from the provisioning device a broadcast message including provisioned site network data;
      store the provisioned site network data in the memory; and
      switch from the default provisioning network to the provisioned site network; and
    wherein at least one of the provisioning device and a remote control device is capable of operability with the at least one of a sensing device an output device; and
    wherein the output device includes a light source for illumination and the at least one of the provisioning device and the remote control device is capable of controlling the light source.

2. The wireless device of claim 1, wherein the light source includes an LED.

3. The wireless device of claim 1, wherein the sensing device includes at least one of an occupancy and vacancy sensor and the provisioning device is configured to enable user configuration of control of the output device based at least in part on occupancy and vacancy data.

4. The wireless device of claim 1, wherein at least one of the default provisioning network and the provisioned site network is a mesh network and the unicast message and broadcast message are received from the provisioning device via at least one intermediate mesh network node formed by another wireless device.

5. The wireless device of claim 1, wherein the default provisioning network data includes a provisioning device security key and a default provisioning network security key.

6. The wireless device of claim 1, wherein the provisioned site network data includes a provisioning device security key, provisioned site network security key, and a device security key.

7. A wireless device system, comprising:
    a provisioning device including a user interface, processor, a memory, and a wireless transceiver;
    a plurality of wireless devices each including:
      a processor;
      a memory coupled to the processor and storing default provisioning network data, including a provisional device address;
      a wireless transceiver coupled to the processor;
      at least one of a sensing device and an output device;
    the provisioning device and the plurality of wireless devices configured to:
      use the default provisioning network data to form a provisioning network;
      send a broadcast message from the provisioning device to request a device address from each of the plurality of wireless devices;
      transmit from each of the plurality of wireless devices to the provisioning device the provisional device address;
      send a unicast message from the provisioning device to each of the plurality of wireless devices, each of the unicast messages including a new device address for the wireless device in a provisioned site network;
      store the new device address in the memory of each of the plurality of wireless devices;
      send a broadcast message from the provisioning device, the broadcast message including provisioned site network data;
      store the provisioned site network data in the memory of each of the plurality of wireless devices; and
      switch the plurality of wireless devices and the provisioning device from the default provisioning network to the provisioned site network; and
      wherein at least one of the default provisioning network and the provisioned site network is a mesh network and the unicast messages and the broadcast messages are received and retransmitted by at least one intermediate mesh network node formed by at least one of the plurality of wireless devices.

8. The system of claim 7, wherein the provisioning device is operable with the at least one of a sensing device and an output device.

9. The system of claim 7, wherein one of the plurality of wireless devices is a remote control device, and the sensing device of the remote control device includes a switch operable by a user to control at least a subset of the plurality of wireless devices.

10. The system of claim 7, wherein the output device of at least one of the plurality of wireless devices includes a light source for illumination and the provisioning device is capable of controlling the light source.

11. The system of claim 10, wherein the light source includes an LED.

12. The system of claim 7, wherein the sensing device of at least one of the plurality of wireless devices includes at least one of an occupancy and vacancy sensor and the provisioning device is capable of configuring control of at least a subset of the plurality of wireless devices based at least in part on occupancy and vacancy data from the sensor.

13. The system of claim 7, wherein the default provisioning network data includes a provisioning device security key and a default provisioning network security key.

14. The system of claim 7, wherein the provisioned site network data includes a provisioning device security key, provisioned site network security key, and a device security key.

15. The system of claim 7, wherein:
the provisioning device is configured to enable a user to divide the plurality of wireless devices into a plurality of subsets; and
the plurality of wireless devices of each of the plurality of subsets are controlled together.

16. A process of provisioning a wireless device system, comprising:
forming a provisioning network using provisioning network data stored in a provisioning device and in a plurality of wireless devices;
send a broadcast message from the provisioning device to request a device address from each of the plurality of wireless devices;
transmit from each of the plurality of wireless devices to the provisioning device the provisional device address;
send a unicast message from the provisioning device to each of the plurality of wireless devices, each of the unicast messages including a new device address for the wireless device in a provisioned site network;
set the new device address for each of the plurality of wireless devices;
send a broadcast message from the provisioning device, the broadcast message including provisioned site network data;
set the provisioned site network data for each of the plurality of wireless devices;
switch the plurality of wireless devices and the provisioning device from the default provisioning network to the provisioned site network;
a user operating the provisioning device to select a subset of the plurality of wireless devices;
operably controlling the subset of the plurality of wireless devices together;
another wireless device broadcasts a join message based on a user setting; and
the provisioning device configuring the another wireless device to join the provisioned site network.

17. The process of claim 16, wherein:
the another wireless device is a remote control device; and
the remote control device is configured to control at least one of the plurality of the wireless devices.

* * * * *